(No Model.)
R. T. BELLS.
PIPE JOINT.
No. 498,876. Patented June 6, 1893.
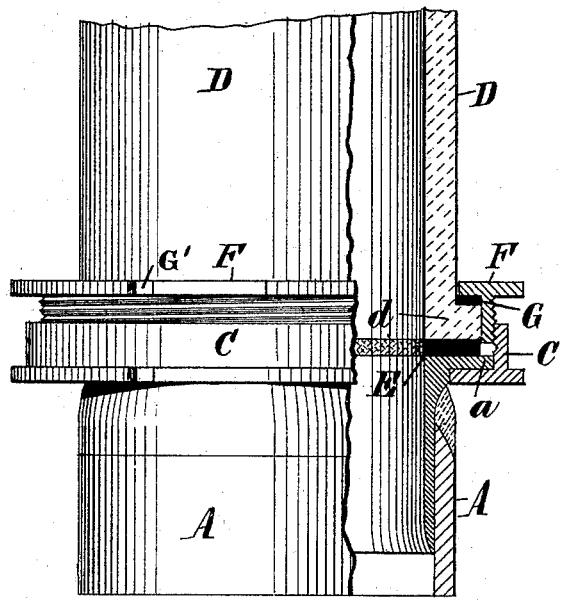
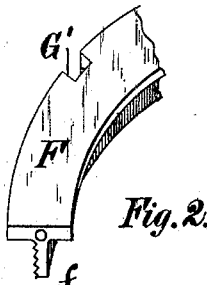
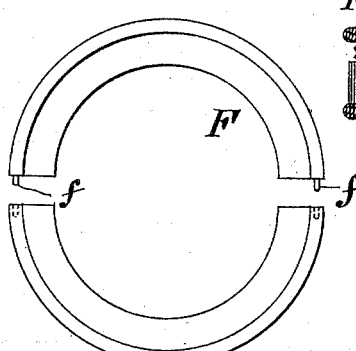
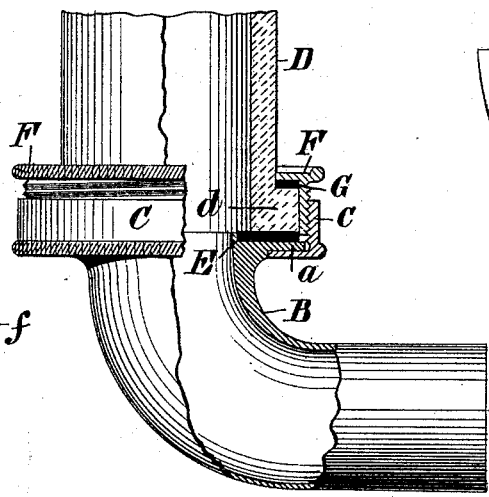
Witnesses
L. T. Griffitt
M. J. Cronin
Inventor
Robert T. Bells
By E. W. Cady
atty.

United States Patent Office.

ROBERT THOMAS BELLS, OF BIRKENHEAD, ASSIGNOR TO EDWARD WILLIAM QUIRK AND JAMES SHARP, OF LIVERPOOL, ENGLAND.

PIPE-JOINT.

SPECIFICATION forming part of Letters Patent No. 498,876, dated June 6, 1893.

Application filed April 22, 1892. Serial No. 430,163. (No model.) Patented in England October 16, 1891, No. 17,752.

*To all whom it may concern:*

Be it known that I, ROBERT THOMAS BELLS, engineer, a subject of the Queen of Great Britain, residing at Birkenhead, in the county of Chester, in the Kingdom of England, have invented certain new and useful Improvements in Pipe-Joints, (for which I have obtained Letters Patent in England, dated October 16, 1891, No. 17,752,) of which the following is a specification.

This invention relates to jointing earthenware to metal, and other cases where there is a beaded pipe end, nozzle, or its equivalent to be attached to a pipe, or its equivalent. It is applicable especially for attaching the flushing pipe to a water closet, soil pipes to water closets, flushing or ventilating joints for water closets, or connecting "P" or "S" or other like traps to lead or other metal pipes, connecting traps for sinks such as those used for butlers' pantries, and generally for use in any position where a glass, earthenware or other fictile or hard structure has to be attached to a metal one. Owing to the small flange or bead which is necessary for the joint to hold on to the orifice of fictile or other hard or brittle ware, it has hitherto been necessary to make a soft joint which afterward hardens, or a flexible joint such as an india-rubber pipe, as other jointed devices at present known will not pass over the bead. Now my invention is designed to form a metallic joint with packing which will pass over this bead.

In the accompanying drawings:—Figure 1 is an elevation, partly in section, showing the method of jointing an earthenware to a straight metal pipe; Fig. 2, a perspective view of a portion of the split gland or ring; Fig. 3 an elevation partly in section of the method of jointing an earthenware to a metal pipe bend; and Fig. 4 a plan of the split gland or ring of Fig. 3.

On a metallic pipe (such as A or B) I form a flange $a$, and place over this flange a screwed projecting ring C, sufficiently large in diameter to receive the bead $d$ of the earthenware pipe D. The face of the flange $a$ is preferably covered with an india-rubber washer E against which the bead $d$ abuts. A split gland or flange F with projecting rim and external screw thread is now placed round the body of the earthenware pipe D, the thread of the flange fitting and being screwed into the screwed ring C. Previous to screwing however, an india-rubber band G or other soft material for making the joint is placed inside, between the bead and the flange.

In order to enable the split flange F to be more easily screwed into the other and to be more manageable, I place projecting pins $f$ on one of the two halves fitting into the holes on the other, or in place of this the two can dovetail or offset into each other in any desired manner. The rims of both flanges can have milled edges, (as shown in Fig. 3) canted sides, slots G' for wrenches (Fig. 2) or other means whereby force can be applied to them to screw them one into the other. By this means a thoroughly satisfactory joint is secured without the rags and putty hitherto used for this purpose.

It is obvious that other materials used for making a joint, such as printers' blankets, asbestus or leather can be used instead of the india rubber. I prefer however the india-rubber for most purposes.

I claim as my invention—

The combination with a metal pipe and an earthenware pipe having an annular flange $a$ and an annular bead $d$, respectively, at their opposing ends, of an internally-threaded and flanged ring C bearing on the flange of the metal pipe, and receiving within it the bead on the earthenware pipe, an externally-threaded and flanged split ring F fitting within the ring C and bearing on the periphery of the bead $d$ on the earthenware pipe, a packing E intervening the flange $a$ and bead $d$ of said pipes, a packing G intervening the split ring F and the upper face of the head $d$, and means, as pins and sockets, for connecting the sections of the split ring F, substantially as shown and described.

In testimony whereof I have signed my name to this specification in the presence of two subscribing witnesses.

ROBERT THOMAS BELLS.

Witnesses:
WM. P. THOMPSON,
W. H. BEESTON.